United States Patent [19]

Lundquist

[11] 4,358,372

[45] Nov. 9, 1982

[54] FILLER TUBE FUEL STRAINER

[75] Inventor: Roger J. Lundquist, Grand Ledge, Mich.

[73] Assignee: General Motors Corporation, Detroit, Mich.

[21] Appl. No.: 226,633

[22] Filed: Jan. 21, 1981

[51] Int. Cl.³ .............................................. B01D 35/02
[52] U.S. Cl. .................................. 210/172; 210/300; 210/315; 210/435
[58] Field of Search ............... 210/172, 299, 300, 315, 210/337, 435, 489, 492

[56] References Cited

U.S. PATENT DOCUMENTS

| 1,081,030 | 12/1913 | Entorf | 210/300 |
| 1,177,277 | 3/1916 | Schaub | 210/172 |
| 2,524,313 | 10/1950 | Gerling | 210/299 |
| 2,923,411 | 2/1960 | Oster | 210/172 |
| 3,016,345 | 1/1962 | Price | 210/315 |
| 3,023,905 | 3/1962 | McDougal et al. | 210/172 |
| 3,080,976 | 3/1963 | Thompson et al. | 210/315 |
| 3,519,560 | 7/1970 | Taylor | 210/489 |
| 3,872,012 | 3/1975 | Endicott | 210/315 |
| 4,304,664 | 12/1981 | McAlindon et al. | 210/172 |

FOREIGN PATENT DOCUMENTS 1200869   5/1957   France ............................... 210/172

OTHER PUBLICATIONS

Miller, "The Parameters That Control The Perf. Of The In-Tank Fuel Strainer," SAE Paper 790091, Mar. 2, 1979, pp. 1–14.

Primary Examiner—Peter A. Hruskoci
Attorney, Agent, or Firm—D. D. McGraw

[57] ABSTRACT

A dual layer fabric insert fuel strainer is positioned at the inlet of a fuel tank filler tube. It has an inner fabric that coalesces water and passes fuel. It has an outer fabric which is sized to pass fuel but not the water coalesced on the inner fabric. The insert therefore traps water between the fabric layers, preventing its introduction into the fuel tank with fuel.

1 Claim, 2 Drawing Figures

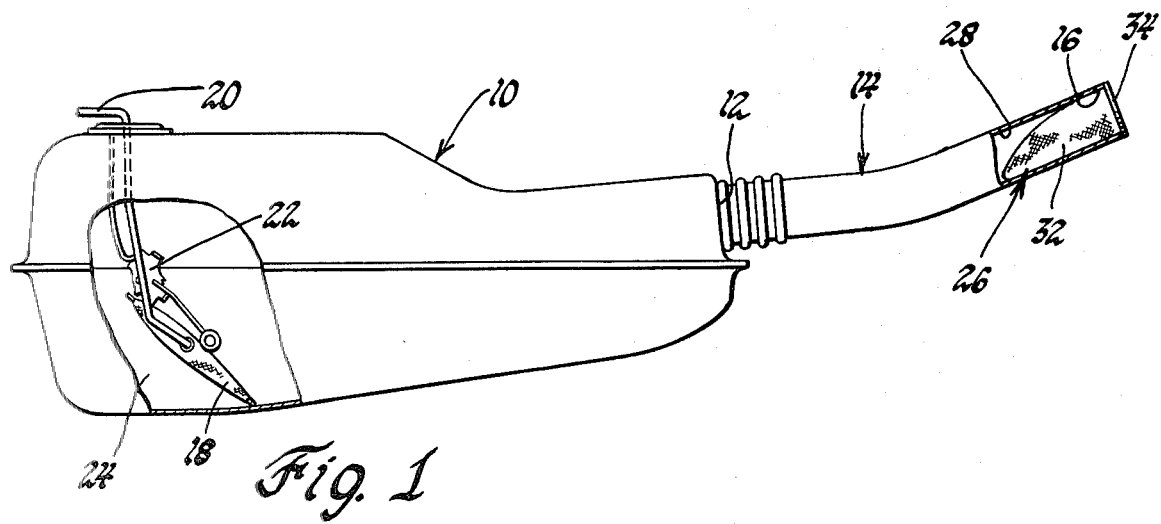
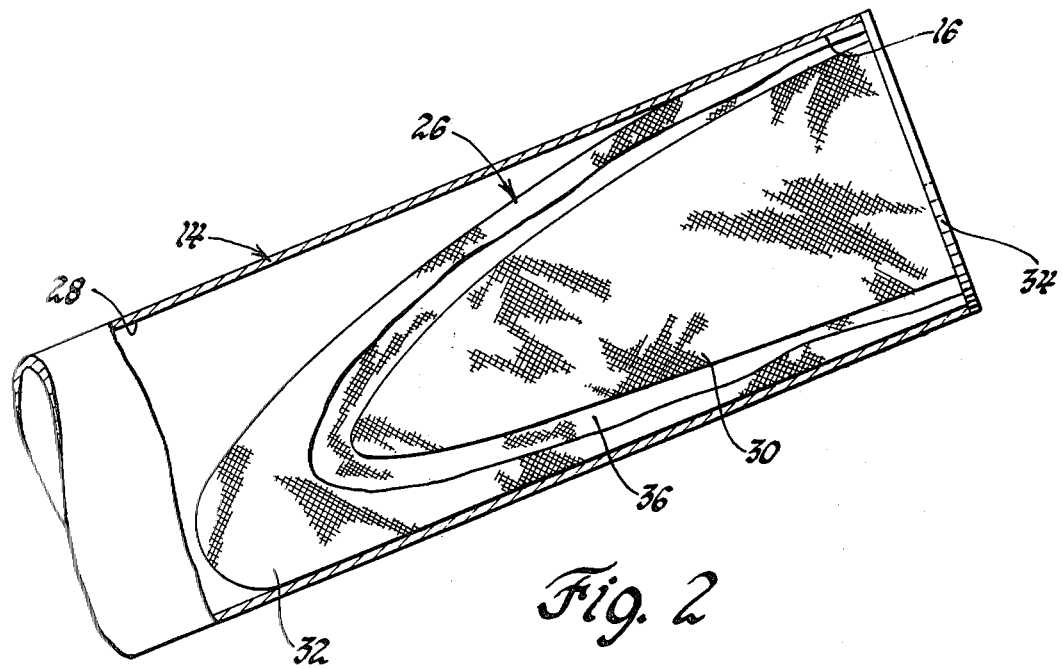

FILLER TUBE FUEL STRAINER

The invention relates to a fuel strainer in the filler tube of a fuel tank of a vehicle, and more particularly to a fuel strainer which will trap water suspended in the fuel so that the water is not delivered to the fuel tank.

It has been common to provide a strainer for various fuels so that as the fuel is delivered to a fuel tank the fuel is strained to prevent various impurities, and particularly solid particles, from entering the fuel tank. Gasoline strainers have been proposed using a strainer body of fine mesh or gauze and so positioned in the inlet of a fuel tank that the fuel entering the tank must flow through the strainer. One such proposal, found in U.S. Pat. No. 1,177,277-Schaub, entitled "Strainer for Gasolene and Other Liquids and Hydrocarbons", patented Mar. 28, 1916, provides a trap below an annular mesh or gauze strainer so that the gasoline or other liquid passes through the mesh into the tank and water or other impurities entrained therein drops to the bottom of the trap, the water being heavier than the gasoline. It is also known to provide various fuel pick-up strainers positioned inside the fuel tank and normally immersed in the fuel in the tank, such strainers preventing dirt particles and water from being removed from the fuel tank. A strainer of this type is the subject of United States Patent application Ser. No. 146,479 entitled "Fuel Strainer Assembly" and filed May 5, 1980 now U.S. Pat. No. 4,304,664. Such a strainer does not prohibit or substantially limit the introduction of water, for example, into the interior of the fuel tank. Therefore the tank may sooner or later contain a considerable amount of water if water has become mixed with the fuel before filling the tank.

The strainer embodying the invention is arranged to coalesce water by use of a mesh fabric that will pass fuel therethrough, formed into an inner sock which first comes into contact with the fuel and any water mixed therewith. An outer sock is provided which will pass fuel but not water, so that any water in the fuel coalesces on the inner sock and is trapped in the space between the inner and outer socks. When water is found to be so trapped, the strainer may be easily removed from the mouth of the filler tube, the water removed, and the strainer replaced.

IN THE DRAWING

FIG. 1 is an elevation view of a vehicle fuel tank assembly having parts broken away and in section and illustrating a strainer embodying the invention in place in the filler tube of the tank.

FIG. 2 is an enlarged view of the inlet portion of the tank filler tube of FIG. 1, illustrating the invention in greater detail, and having parts broken away and in section.

The vehicle fuel tank 10 is illustrated as having a tank inlet 12 to which is connected the tank filler tube 14. The tube extends upwardly and sufficiently away from the fuel tank so that it is located in a suitable portion of a vehicle in which the tank is installed so as to make the tube inlet 16 accessible for introducing engine fuel into the tank as needed. The tank is illustrated as having a fuel pick-up strainer 18 positioned in a lower part of the tank and connected to a fuel outlet 20 to deliver fuel from the tank 10 to the vehicle engine. A fuel level sensor and signal sending mechanism 22 is also illustrated as being located within the tank 10. The fuel for the vehicle engine is contained within the cavity 24 of the tank.

The fuel strainer 26 to which the invention is directed is installed in the filler tube inlet 16 and extends within the filler tube passage 28 toward the tank inlet 12. The strainer 26 is illustrated in greater detail in FIG. 2. It is essentially formed of an inner sock 30, an outer sock 32 and a support ring 34. The openings of the inner and outer socks are secured to the support ring 34 and the support ring assists in mounting the socks in place in the tube passage 28. A space 36 is provided between inner sock 30 and outer sock 32 by making the inner sock 30 somewhat smaller in length and in overall diameter than the outer sock.

The inner sock is made of a mesh fabric that coalesces water and passes fuel therethrough. The outer sock is made of a mesh fabric that will pass fuel therethrough but not water. Thus when fuel is introduced into the filler tube inlet it flows through the strainer 26 by passing first through the inner sock 30, then through space 36, and then through outer sock 32 and on to the tank inlet 12 through passage 28. Any water in the fuel coalesces on the inner sock and is trapped in the space 36 between the inner and outer socks.

A description of mesh fabrics which may be used in the strainer 26 is to be found in S.A.E. paper number 790091 presented to and published by the Society of Automotive Engineers, Inc. (S.A.E.) in 1979. The paper is entitled, "The Parameters that Control the Performance of the In-Tank Fuel Strainer". While directed to in-tank fuel strainers located and used in the manner of strainer 18, the discussion of various fabrics is of interest. It includes guidance in choosing fabrics and weaves that ensure optimum performance for various types of liquid fuels. The strainer arrangements discussed by the paper involve only a single strainer or sock.

The in-tank strainer in the above mentioned application Ser. No. 146,479 is a dual sock strainer in which the first strainer encountered by the fuel to be strained is the outer strainer. It has a desirable fuel wetting capability which will pass fuel therethrough but will prevent water from passing therethrough. The fuel which passes through that strainer may or may not have wax crystals formed therein when diesel fuel oil, for example, is at or below the cloud point. A similar mesh fabric may be used in the outer sock 32 of the strainer herein disclosed and claimed, which is the second sock to be encountered by fuel passing through the strainer.

The inner strainer of the above mentioned application is also wetted by fuel so as to pass the fuel therethrough, but will prevent diesel fuel oil wax crystals from passing therethrough. It therefore has somewhat different characteristics from the sock 30 of strainer 26 herein disclosed and claimed. It is important that the inner sock 30, the first sock to be encountered by the fuel, permit the fuel to pass therethrough together with any water in the fuel, but to be able to coalesce the water on the mesh fabric of sock 30 and within the space 36 between the two socks. Previous in-tank strainers, as well as lubricating oil filter and strainer arrangements, have used suitable coalescing materials to coalesce water on one side of the strainer or filter. The invention herein disclosed and claimed lies in the particular cooperative arrangement set forth so as to prevent fuel from entering the fuel tank with water contained therein, and permitting the easy removal of the water separated from the fuel.

The embodiments of the invention in which an exclusive property or privilege is claimed are defined as follows:

1. In a liquid fuel tank assembly comprising a tank, a filler tube providing a tank inlet for placing fuel in the tank, and a tank outlet for removing fuel from the tank, the improvement comprising:

a fuel strainer in said filler tube, said strainer being generally sock-shaped and consisting only of an inner sock, an outer sock receiving said inner sock therein in spaced relation so that a space for containing water to be trapped is provided therebetween, and a support ring secured to the open ends of said inner and outer socks and removably supporting said strainer in said filler tube, said inner sock being made of a mesh fabric that coalesces water and passes fuel therethrough, said outer sock being made of a mesh fabric that passes fuel but not water therethrough, wherein fuel introduced through said filler tube into said tank flows through said strainer and any water in the fuel coalesces on said inner sock and is trapped in said space between said inner and outer socks;

said fuel strainer being periodically removable from said filler tube with water trapped in said space, the trapped water then being removed and said fuel strainer then being replaced in said filler tube.

* * * * *